5 Sheets--Sheet 1.

J. R. HOWELL.
Wind and Water Motors.

No. 151,880. Patented June 9, 1874.

WITNESSES-
Jas. E. Hutchinson
John R. Young

INVENTOR-
J. R. Howell, by
Prindle and Deane, his Attys

J. R. HOWELL.
Wind and Water Motors.

No. 151,880. Patented June 9, 1874.

WITNESSES-
Jas. E. Hutchinson
John R. Young

INVENTOR.
J. R. Howell, by
Prindle and Dean, his Attys

J. R. HOWELL.
Wind and Water Motors.
No. 151,880. Patented June 9, 1874.
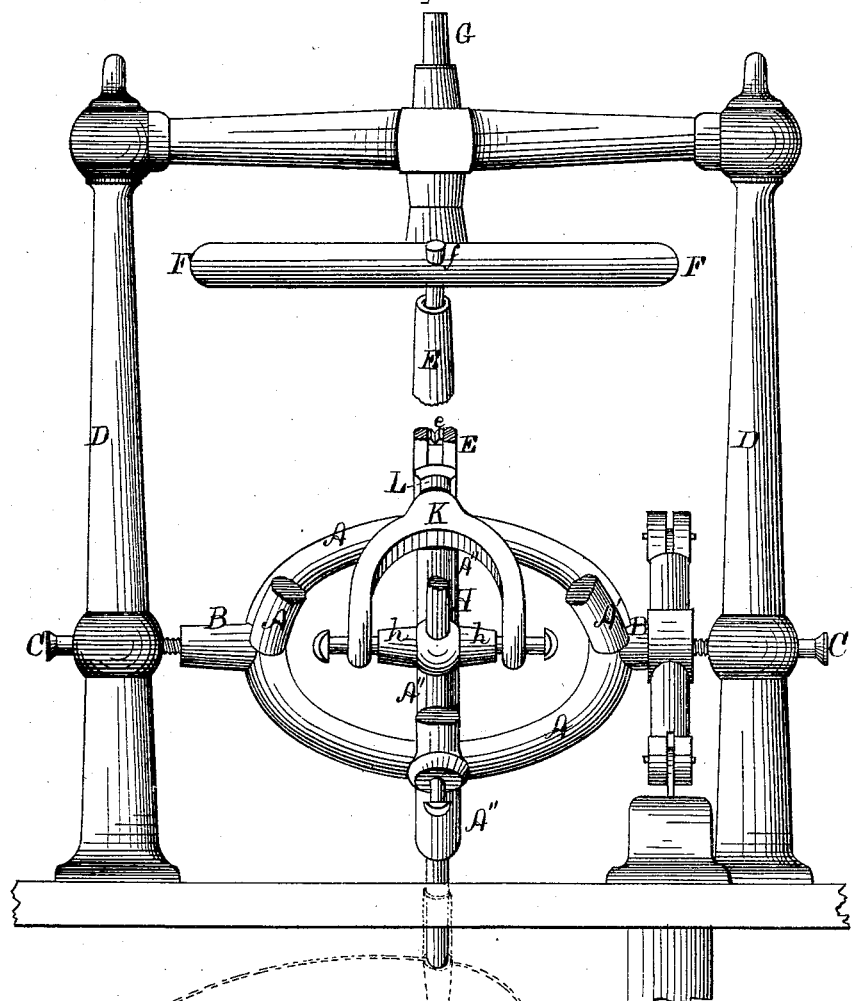

5 Sheets--Sheet 5.
J. R. HOWELL.
Wind and Water Motors.
No. 151,880.                                Patented June 9, 1874.
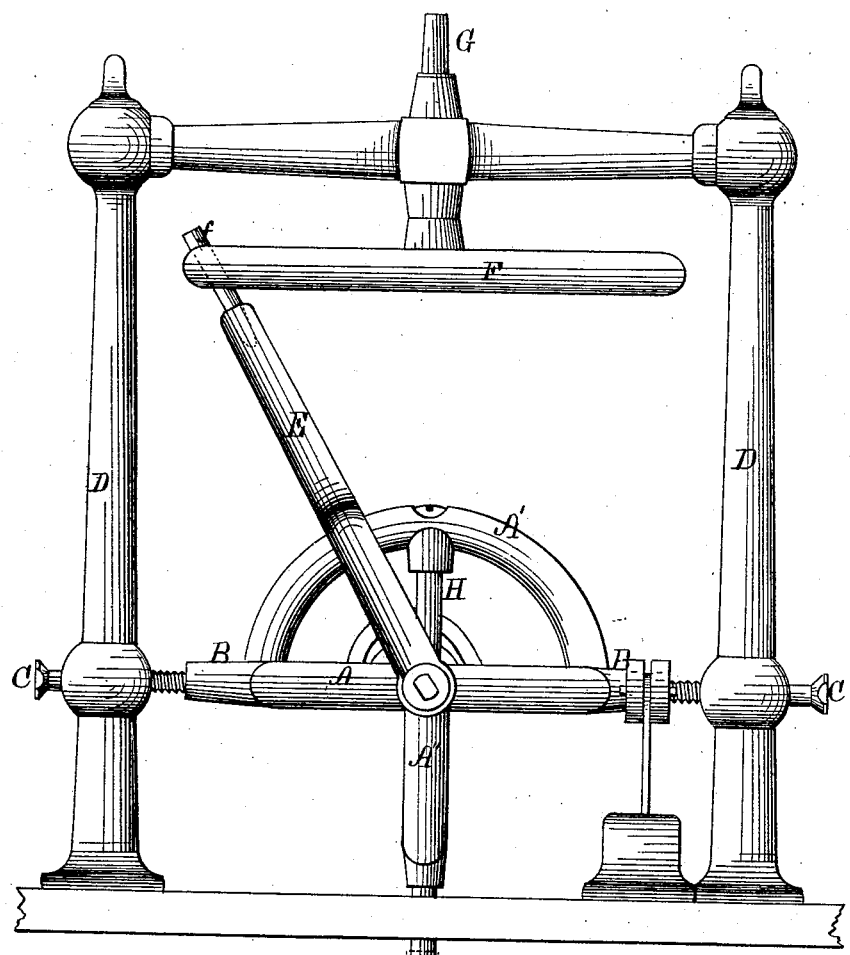

UNITED STATES PATENT OFFICE.

JULIUS R. HOWELL, OF ROME, GEORGIA.

IMPROVEMENT IN WIND AND WATER MOTORS.

Specification forming part of Letters Patent No. 151,880, dated June 9, 1874; application filed May 11, 1874.

*To all whom it may concern:*

Be it known that I, JULIUS R. HOWELL, of Rome, in the county of Floyd and in the State of Georgia, have invented certain new and useful Improvements in Wind and Water Motors; and do hereby declare that the following is a full, clear, and exact description thereof, reference being had to the accompanying drawings making a part of this specification, in which—

Figure 1:
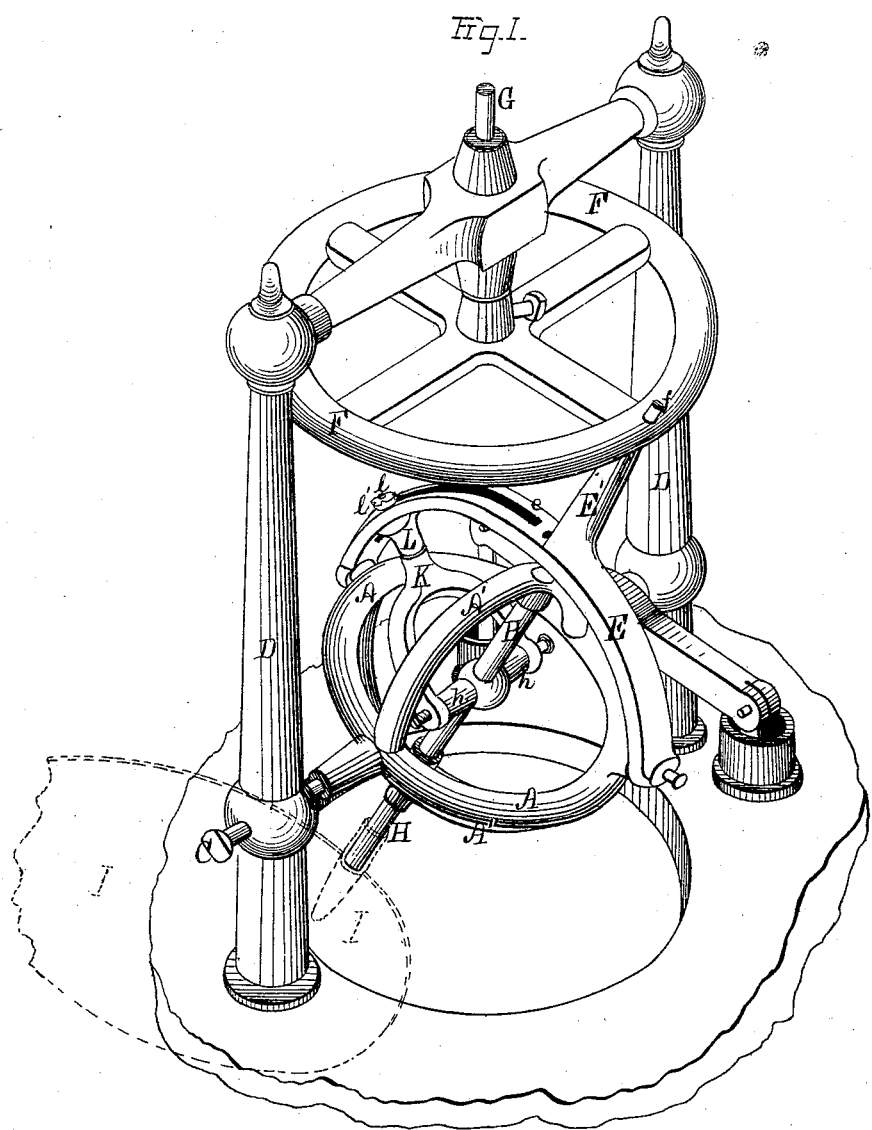
Figure 2:
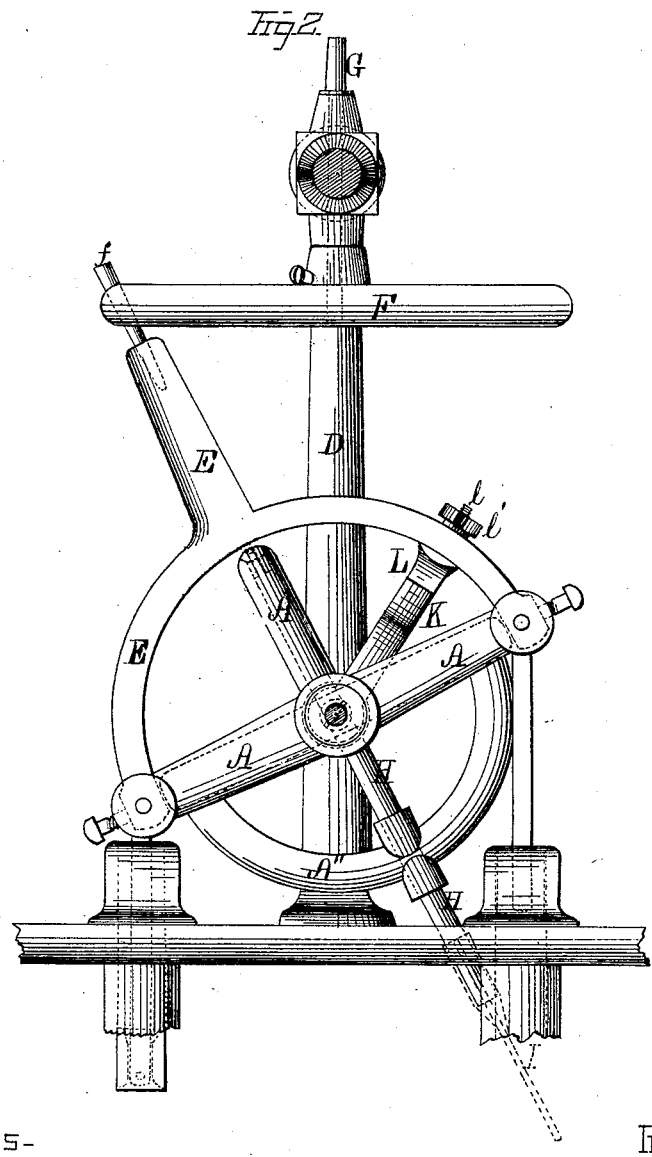
Figure 3:
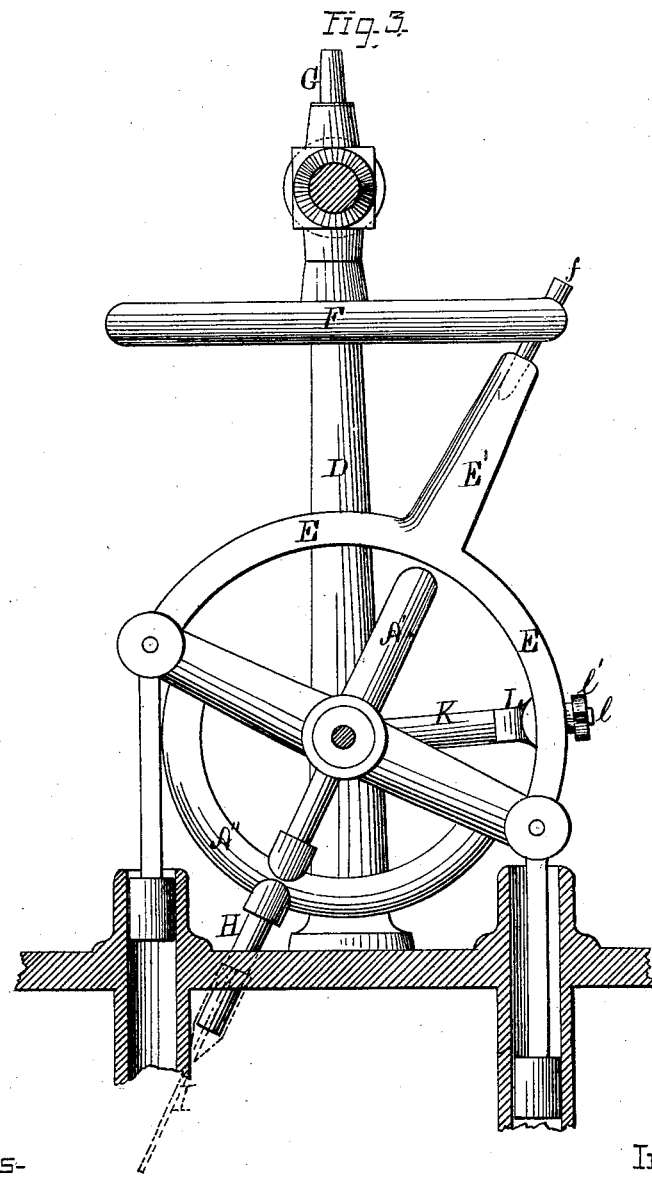

Figure 1 is a perspective view of my improved device as arranged for operation by a current of water, and Figs. 2, 3, 4, and 5 are side elevations of the same, showing the operative mechanism in different positions.

Letters of like name and kind refer to like parts in each of the figures.

The design of my invention is to furnish a simple, efficient, and inexpensive means whereby the force of a wind or water current may be utilized for the purpose of operating machinery; and it consists, principally, in the means employed for converting a reciprocating movement of the operating blade or vane into a rotary motion of the driving-shaft, substantially as and for the purpose hereinafter specified. It consists, further, in the means employed for giving to the shaft of the blade or vane a semi-rotary motion in opposite directions, substantially as and for the purpose hereinafter shown. It consists, further, in the means employed for regulating the degree of oscillation of the vane-shaft within its bearings, substantially as and for the purpose hereinafter set forth.

As my apparatus is merely reversed in position when used for wind or water currents, it will be necessary to show its application in but one of said positions, which, for convenience, is as a water-motor.

In the annexed drawings, A represents a circular metal ring, provided upon opposite edges with radial trunnions B and B, and having attached to opposite sides two half rings, A' and A'', that are, preferably, placed at right angles to each other, as shown, the upper part, A', being in a line with said trunnions, the whole forming a skeleton globe-frame. The frame described is suspended at its trunnions upon two bearing-screws, C and C, that extend horizontally inward through suitable vertical supports D and D, such arrangement enabling said frame to oscillate freely in a vertical plane. Pivoted upon the periphery of the ring A, at equidistant points between the trunnions B and B, is a curved bar, E, which, at its upper side and longitudinal center, is provided with an arm, E', that extends radially upward and embraces a stud, *f*, that is secured within the rim and lower side of a wheel, F, which latter is connected to or with a shaft, G, and is arranged to revolve in a horizontal plane. The arrangement shown causes an oscillating motion of the ring A upon its trunnions to impart, through the pivoted bar, E E', a rotary motion to the wheel F, the latter operating as a balance-wheel for the device. Journaled within suitable bearings at the centers of the curved bars A' and A'', is a shaft, H, which extends downward, and at its lower end is provided with a vane or blade, I, that is principally or entirely in rear of the same, and has any desired shape in side elevation. Midway between its bearings the shaft H is provided with an arm, *h*, that extends horizontally outward in opposite directions and in a line with the blade I, and has pivoted to or upon its ends the divided end of a forked bar, K, which latter from thence extends outward and upward, and has its opposite outer end pivoted to or upon one portion of the curved bar E. For convenience in changing the pivotal point of the bar K, the curved bar E is provided with a slot, *e*, which receives a block, L, that, at its inner end, furnishes a bearing for said bar K, while upon its outer end is formed a screw, *l*, that receives a nut, *l'*. When the nut *l'* is loosened, the bearing-block L may be moved freely within the slot *e*; but, by screwing said nut against the face of the bar E, said block is firmly locked in position.

The device is now complete, and, being placed so that the vane or blade is immersed within a current of water, operates as follows: By means of the forked bar K, that is pivoted upon the shaft H and curved bar E, said shaft is turned within its bearings, so as to cause the vane or blade I to stand at an angle to the line of the current, except when, by the oscillation of the globe-frame A, A', and A'', said vane has reached the limit of its lateral motion in either direction, at which points said vane is for an instant in a line with said current, but rapidly changes its position, so as to have an opposite inclination when moving away, from that presented when moving toward such dead-centers. The force of the current, being thrown against the forwardly-inclined side of the vane, causes the latter to move laterally in an opposite direction until its limit of such motion is reached, when said vane is turned so as to present its opposite face or side to the current, and is then moved back to its former position, the balance-wheel operating to move the mechanism over the dead-centers, and to change the angle of said vane, while the latter, between such centers, receives the force of the current and transmits the same to said wheel. The operations described proceed automatically, the speed of the apparatus being governed by the velocity of the current and the greatest inclination of the vane, the latter being increased or diminished by moving the pivotal bearing-block L away from or toward the pivotal bearing of the curved bar E. By reversing the mechanism described, so as to cause the vane to be above instead of below, the device may be used as a wind-motor.

Having thus fully set forth the nature and merits of my invention, what I claim as new is—

1. The globe-frame A, A', and A'', arranged to oscillate upon the trunnions B and B, and the bar E and E' pivoted upon and extending between said frame and the wheel F, said parts being constructed and combined to operate in the manner and for the purpose substantially as specified.

2. In combination with the shaft H, journaled within the oscillating globe-frame A, A', and A'', and provided with the arm $h$, the forked bar K, pivoted upon and extending between said arm and the curved bar E, substantially as and for the purpose shown.

3. In combination with the slotted bar E and $e$, and with the forked bar K, the pivotal block L sliding within the slot $e$, and secured in place by means of the screw $l$ and nut $l'$, substantially as and for the purpose set forth.

In testimony that I claim the foregoing, I have hereunto set my hand this 27th day of April, 1874.

JULIUS R. HOWELL.

Witnesses:
JUNIUS GEORGE,
WILLIAM D. ELAM.